Patented Feb. 10, 1953

2,628,207

UNITED STATES PATENT OFFICE 2,628,207

TEREPHTHALATE ESTERS AS PLASTICIZERS FOR POLYVINYL RESINS

Paul V. Smith, Jr., Westfield, David W. Young, Roselle, and Raymond G. Newberg, Roselle Park, N. J., assignors to Standard Oil Development Company, a corporation of Delaware No Drawing. Application September 14, 1949, Serial No. 115,762

4 Claims. (Cl. 260—31.8)

This invention relates to a new type of ester which has been found to be particularly effective as plasticizer for resinous or rubber-like materials such as vinyl chloride polymers or copolymers. In particular this invention relates to vinyl resin compositions plasticized with alkyl esters of terephthalic acid such as the various octyl terephthalates.

The ever expanding use of plastic materials such as vinyl resins, ethyl cellulose, cellulose acetate or nitrate, polyacrylate resins, polymethylmethacrylate resins, rubbers such as the emulsion copolymers of butadiene with a minor amount of styrene or acrylonitrile, or the copolymers of isobutylene with small amounts of a diolefin such as isoprene or butadiene have created a large demand for suitable plasticizers. Various alkyl esters and particularly di-2-ethylhexyl phthalate and di-n-octyl phthalate have been known to be fairly satisfactory plasticizers for the aforementioned high molecular weight materials, but the supply of these plasticizers has been considerable difficulty keeping up with the growth of the plastics industry, largely because of the raw materials necessary for the manufacture of the esters. Furthermore, the plastics industry has been continually demanding plasticizers which would be non-fugitive and give plastic products having a lower embrittlement temperature as well as improved aging properties, particularly as regards the effects of heat and light.

It is the object of this invention to provide the art with a new source of alkyl phthalate esters. Another object is to provide alkyl phthalate esters having improved plasticizing characteristics. Another object is the production of plastic compositions having superior properties. Still other objects will appear from the subsequent description.

It has now been discovered that new alkyl esters can be derived from terephthalic or 1,4-benzenedicarboxylic acid, which esters are in many respects superior to the corresponding isomers of the common ortho-phthalate or 1,2-benzene-dicarboxylic acid. The alkyl groups of the ester may contain from seven to twelve carbon atoms, depending on the alcohol or alcohols used in the esterification. Particularly outstanding esters can be obtained by preparing the terephthalic acid ester from an octyl alcohol such as n-octyl, 2-octyl (capryl), 2-ethylhexyl, and especially from "iso-octyl" alcohol. The latter expression is used herein to designate a mixture of C8 alcohols made from a suitable seven-carbon olefin mixture by the Oxo reaction, as is well-known per se and as is further described on pages 3 to 7, inclusive, of copending U. S. patent application, Serial No. 91,424, filed on May 4, 1949, to which reference is made hereby. Other alcohols having 7 to 12 carbon atoms such as heptyl, isononyl (prepared by the Oxo reaction from a C8 olefin feed such as diisobutylene) and lauryl are also useful for the purposes of the present invention, but to a more limited extent since they lack the extremely favorable balance between non-volatility and plasticizing efficiency possessed by the octyl terephthalates.

As has been known heretofore, terephthalic acid can be prepared in various ways, as by the oxidation of p-xylene with nitric acid or chromic acid, or by oxidizing p-toluene carboxylic acid with an alkaline permanganate or the like. Mixed xylenes containing a substantial proportion of p-xylene may also be used as a starting material for the oxidation inasmuch as esters derived from a blend containing terephthalic acid in admixture with one or both of its other phthalic acid isomers are superior to the pure o-phthalate esters. If desired, intermediate derivatives such as terephthalyl chloride can be formed from terephthalic acid in the same manner as other acyl chlorides are formed. i. e., by reacting the acid with phosphorus pentachloride, and the acyl chloride can then be used for preparing the esters therefrom.

The esters useful for the purposes of the present invention can be prepared by conventional esterification methods, with or without a catalyst. The preferred method of ester synthesis involves refluxing about 1 mol of terephthalyl chloride, about 2 to 2.5 moles of alcohol and 1 to 1.5 moles of a diluent such as dioxane or other inert solvent suitable for lowering the reflux temperature. Refluxing is continued until no more hydrogen chloride is evolved. The resulting ester is then washed in the usual manner to remove any residual acid and dried over a drying agent. Alternatively, the desired ester may be made by ester interchange from methyl terephthalate, for example.

Furthermore, the esters used in the subsequent examples were distilled and only the center cut amounting to about 70% to 90% of theoretical yields was used for plasticizing purposes, so as to have as pure compounds as practical. It will be appreciated, however, that this distillation was carried out solely for the purpose of obtaining strictly comparable data, but that such a distillation is not normally necessary in the actual utilization of the present invention.

3

The following examples will serve to illustrate the present invention, though it will be understood of course that the invention is not limited thereto and that modifications or variations thereof are possible without departing from the spirit of the invention or from the scope of the appended claims. It will be understood further that all quantitative proportions referred to in the present description and appended claims are expressed on a weight basis, unless expressly indicated otherwise.

EXAMPLE 1

An o-phthalic ester of isooctyl alcohol and the corresponding terephthalate isomer were prepared and evaluated as follows: Commercial isooctyl alcohol used for the esterification was prepared from a $C_7$ olefin cut by oxonation and consisted of a mixture of isomers to which the following formula may be assigned:

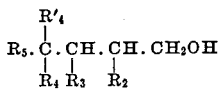

wherein radicals $R_2$ plus $R_3$ plus $R_4$ plus $R'_4$ plus $R_5$ contain a total of four carbon atoms and wherein $R_2$ stands for H, $CH_3$, i-$C_3H_7$; $R_3$ stands for H, $CH_3$, $C_2H_5$ or i-$C_3H_7$; $R_4$ stands for H, $CH_3$ or $C_2H_5$; $R'_4$ stands for H or i-$CH_3$; and $R_5$ stands for H, $CH_3$, $C_2H_5$, i-$C_3H_7$ or tert-$C_4H_9$. The principal isomers contained in the mixture are believed to be 4,5-dimethyl hexanol, 3,5-dimethyl hexanol, 4-ethyl hexanol, 3,4,4-trimethyl pentanol and 5,5-dimethyl hexanol. The isooctyl alcohol had the following properties:

*Table I*

PHYSICAL PROPERTIES OF "ISO-OCTYL" ALCOHOL

Hydroxyl No. _____ 422
Carbonyl No. _____ 1.1
Saponification No. _____ 0.6
Acid No _____ 0.0
Specific Gravity 20/20 _____ 0.835
Water Content _____ Miscible with 19 vol. of 60° Bé. naptha at 20° C.
APHA color, Pt-Co Scale _____ 15
Phthalate Ester Color, Pt-Co Scale (high temperature test) _____ 60

A. S. T. M. DISTILLATION

| Percent | Temp., °C. |
|---|---|
| Initial | 186.0 |
| 5 | 186.5 |
| 10 | 186.7 |
| 20 | 187.0 |
| 30 | 187.1 |
| 40 | 187.5 |
| 50 | 187.5 |
| 60 | 187.8 |
| 70 | 188.0 |
| 80 | 188.2 |
| 90 | 189.4 |
| 95 | 190.5 |
| Dry Point | 191.8 |

The o-phthalate was prepared by refluxing a mixture of 148 g. (1.0 mole) of phthalic anhydride, 286 g. (2.2 moles) of isooctyl alcohol, 2 g. of p-toluene sulfonic acid monohydrate and 150 ml. of toluene until no more water was collected in the esterification trap. The mixture was washed three times with a saturated, aqueous sodium carbonate solution, once with water and then dried over anhydrous calcium sulfate. The dried ester product was distilled at 204–211° C. (1 mm. Hg) so as to obtain a heart cut of 345 g. (88.5 percent of theoretical).

The terephthalic ester was prepared by refluxing a mixture of 203 g. (1.0 mole) of terephthalyl chloride, 286 g. (2.2 moles) of isooctyl alcohol and 100 ml. dioxane until no more hydrogen chloride was evolved. The product was then washed and dried as described above, and distilled to give a heart cut weighing 291 g. (74.6% of theoretical) and boiling at 127–138° C. at 4 microns Hg.

Representative physical properties of the isomeric phthalates are listed in Table II:

*Table II*

PHYSICAL PROPERTIES OF ISOMERIC DI-ISO-OCTYL PHTHALATE ESTERS

| Ester | Di-iso-octyl Phthalate | Di-iso-octyl Terephthalate |
|---|---|---|
| Sp. Gr., 15.6°/15.6° C. (60°/60° F.) | 0.990 | 0.987 |
| Pour Point, °C | −45.6 | −40 |
| Refractive Index $n_D^{20}$ | 1.4871 | 1.4893 |
| Surface Tension (dynes/cm.) | 33.0 | 33.7 |
| Kinematic Viscosity (centistokes): | | |
| 100° C | 4.44 | 5.65 |
| 37.8° C | 30.00 | 38.40 |
| 20° C | 79.08 | 101.28 |
| −9.4° C | 936.0 | 1170.0 |
| −31.7° C | 17,690 | 20,687 |
| A. S. T. M. Slope | 0.827 | 0.765 |
| Viscosity Index | 33 | 92 |
| Sap. No. (mg. KOH/g.) | 288.5 | 286.0 |
| Boiling Point, 760 mm. (calculated) °C | [1] 429–437 | [1] 401–418 |

[1] The spread of the distillation is attributable to the complex mixture of isomeric $C_8$ alcohols constituting the isooctyl alcohol used in the esterification.

It is of interest to note that, in comparison with the orthophthalate, the viscosity of the terephthalate isomer is higher to a surprisingly great extent. At the same time the viscosity-temperature characteristics, as reflected by A. S. T. M. slope and viscosity index, show a very substantial advantage in favor of the terephthalate isomer.

EXAMPLE 2

The effectiveness of terephthalate esters as plasticizers, in comparison with the o-phthalate isomers, has been determined in illustrative runs employing a commercial resinous copolymer of 95% vinyl chloride and 5% vinyl acetate (Vinylite VYNW).

The following typical formulation has been used:

| | Parts by weight |
|---|---|
| Resin | 100 |
| Basic lead carbonate | 3 |
| Stearic acid | 1.5 |
| Ester plasticizer | 50 |

The ingredients were stirred together in a glass vessel and after blending, the mixture was heated gently to start solvation of the resin in the ester plasticizer. The blend then was charged to a 6 x 12 inch laboratory rubber mill heated with steam to 150° C. The resin was fluxed about two minutes and allowed to mill with a rolling bank for five minutes with occasional cutting. Qualitative tests indicated a good mix was obtained in five minutes. Finally, each batch was taken off the mill as a sheet 0.125 inch thick.

The compounds were molded in a standard A. S. T. M. four-cavity mold (D15–41) yielding slabs 6 x 6 x 0.075 inch. The molding cycle was 10 minutes at minimum ram pressure at 138° C., then 10 minutes at 900 lbs./sq. in. at 138° C., and finally cooled under pressure by running cold water through the press platens. The molded slabs were allowed to condition at 77° F. and 50% relative humidity for at least 24 hours before testing.

Tensile strength, 100% modulus, and ultimate elongation of the various specimens were determined in the usual manner, using a Model L–3

Scott tester at 25° C. and 50% relative humidity. Hardness was determined using the Shore A durometer (A. S. T. M. D-677-44T). Brittle temperature was determined using the instrument described under A. S. T. M. D-746-44T. The stiffness index in pounds per square inch was determined using the Tinius-Olsen Tour-Marshall tester (A. S. T. M. D-747-43T). Volume increase in standard solvents was determined at 25° C., using the following solvents: A. S. T. M. Reference Fuel No. 1 (pure diisobutylene), A. S. T. M. Reference Fuel No. 2 (60% diisobutylene, 20% toluene, 15% xylene and 5% benzene), A. S. T. M. Oil No. 1 (a viscous mineral oil with an aniline point of 123.9° C.) and A. S. T. M. Oil No. 3 (a low viscosity index mineral oil with an aniline point of 123.9° C.). Heat aging data were obtained on specimens aged at 121.1° C. in a hot air circulating oven designed to give reproducible results in multiple testing. Light aging was studied on 6 x 6 x 0.075 inch pressed slabs exposed to ultraviolet light for 150 hours in a Fadeometer at 51.6° C.

The results obtained are listed in Table III and clearly show the effect of the two types of phthalate structure on plasticizer performance. It will be noted that both esters give resin compounds having approximately the same original tensile strength, but that the compound containing the terephthalic isomer has an appreciably greater ultimate elongation, has a somewhat higher modulus, higher Shore hardness and higher stiffness index, which may possibly be correlated with the higher viscosity of the ester itself. Furthermore, the resin compound containing the terephthalate has a distinctly lower embrittlement temperature than the corresponding o-phthalate compound. This is surprising since previous experience indicated that the higher the viscosity of the ester, the poorer the low temperature brittleness of the plasticized resin.

The superiority of the terephthalate resin is particularly clearly apparent from the heat and light aging data. The resin plasticized with the terephthalate consistently retains more of its elasticity as reflected by the ultimate elongation figures. The difference on the specimens exposed to the severe aging conditions for seven days is particularly striking since it can be seen from the elongation figures that the resin plasticized with the o-phthalate retained only about 14% of its initial extensibility whereas the resin containing the terephthalate retained more than 66% of its initial extensibility and was almost as extensible as the resin plasticized with the o-phthalate was to begin with. Another outstanding difference can be observed from the weight loss figures. These show almost twice as great a loss for the o-phthalate as for the terephthalate for any given exposure, which is particularly surprising when the volatility data of the two esters are considered, it being shown in Table II that the calculated boiling range of the terephthalate is about 20° C. lower than the calculated boiling range of the o-phthalate.

In summary, the invention relates to novel alkyl esters of terephthalic acid which, apparently due to their more nearly linear structure, have surprisingly more favorable plasticizing properties than their isomers derived from o-phthalic acid. Especially unexpected results can be obtained in accordance with the present invention by using esters of terephthalic acid and iso-octyl alcohol as plasticizers for polymeric materials.

Table III

Comparison of Isomeric Di-Iso-Octyl Phthalate Plasticizers in Vinyl Compounds

| Stock No | 616-91-2 | 616-91-1 |
|---|---|---|
| VYNW | 100 | 100 |
| Di-Iso-Octyl Phthalate | 50 | |
| Di-Iso-Octyl Terephthalate | | 50 |
| Basic Lead Carbonate | 3 | 3 |
| Stearic Acid | 1.5 | 1.5 |
| Specific Gravity | 1.246 | 1.251 |
| Tensile, lb. per sq. inch | 2,900 | 3,100 |
| 100% Modulus, lb. per sq. inch | 1,580 | 1,750 |
| Ultimate Elongation, per cent | 280 | 350 |
| Shore Hardness (Instant) | 85 | 90 |
| Tinius-Olsen Tour-Marshall Stiffness, lb. per sq. inch: | | |
| 23.89° C | 1,180 | 2,170 |
| 1.67° C | 7,669 | 16,720 |
| −12.20° C | 32,740 | 50,167 |
| Bell Telephone Brittle Temperature, ° C. (Break) | −23.5 | −28.9 |
| Volume Increase after 168 Hours at 23.89° C.: | | |
| A. S. T. M. Fuel No. 1, per cent | −8.6 | +1.7 |
| A. S. T. M. Fuel No. 2, per cent | −8.0 | −7.0 |
| A. S. T. M. Oil No. 1, per cent | −0.3 | −0.2 |
| A. S. T. M. Oil No. 3, per cent | −0.1 | −0.2 |
| Oven-Aged 3 Days at 121.1° C.: | | |
| Tensile, lb. per sq. inch | 2,930 | 3,050 |
| 100% Modulus, lb. per sq. inch | 2,450 | 2,200 |
| Ultimate Elongation, per cent | 210 | 300 |
| Shore Hardness (Instant) | 90 | 91 |
| Weight Loss, per cent [1] | 8.56 | 5.14 |
| Oven-Aged, 7 Days at 121.1° C.: | | |
| Tensile, lb. per sq. inch | 4,800 | 3,100 |
| 100% Modulus, lb. per sq. inch | | 2,800 |
| Ultimate Elongation, per cent | 40 | 230 |
| Shore Hardness (Instant) | 90 | 91 |
| Weight Loss, per cent [1] | 16.41 | 9.50 |
| Light Aged, 150 Hours Ultra-Violet Light at 51.6° C | (2) | (3) |

[1] Average of 2 determinations.
[2] Severe spotty discoloration.
[3] Appearance unchanged.

The iso-octyl alcohol is best derived from a heptylene feed by oxonation, a suitable heptylene feed being obtainable by U. O. P. polymerization of a C$_3$–C$_4$ olefin cut.

In particular, the invention relates to plasticized resin compositions containing the novel esters as plasticizers, usually in proportions ranging from about 5 to 100 parts or preferably 30 to 60 parts per 100 parts of resin. Polymeric materials which lend themselves to successful plasticization with the esters of the invention include the various vinyl resins such as polyvinyl chloride, polyvinyl acetate, polyvinyl alcohol, mixed polymers of vinyl chloride with vinyl acetate, or vinylidene chloride, polyvinyl butyral or other polyvinyl acetals; acrylate and methacrylate resins, rubber-like polymers of diolefinic materials such as butadiene-nitrile (GR-A), butadiene-styrene (GR-S) or polychloroprene elastomers, or isobutylene-diolefin copolymers of the GR-I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile content. It will be understood, of course, that in addition to the plasticizer, the polymer compositions may also contain about 1 to 10 or 25 parts of conventional stabilizers such as basic lead carbonate, lead stearate, sodium borate or the like, as well as suitable amounts of oleic acid, auxiliary plasticizers or softeners, fillers, pigments and eventually also curing agents, when the polymer itself is of the curable type.

The appended claims define the scope of the invention.

We claim:
1. A composition of matter comprising 100 parts of a resinous copolymer of about 95% vinyl chloride and about 5% vinyl acetate, and 5 to 100 parts of a diocetyl terephthalate.

2. A composition of matter comprising 100 parts of a brittle polyvinyl resin and 30 to 60 parts of di-iso-octyl terephthalate.

3. A composition of matter comprising 100 parts of a resinous copolymer of about 95% vinyl chloride and about 5% vinyl acetate and about 50 parts by weight of a dioctyl terephthalate.

4. A composition of matter comprising 100 parts of a resinous copolymer of about 95% vinyl chloride and about 5% vinyl acetate and about 50 parts by weight of di-iso-octyl terephthalate.

PAUL V. SMITH, JR.
DAVID W. YOUNG.
RAYMOND G. NEWBERG.

REFERENCES CITED

The following references are of record in the file of this patent:

UNITED STATES PATENTS

| Number | Name | Date |
|---|---|---|
| 1,993,736 | Graves et al. | Mar. 12, 1935 |
| 2,325,951 | Gresham | Aug. 3, 1943 |